US005590866A

United States Patent [19]

Cunningham

[11] Patent Number: 5,590,866

[45] Date of Patent: Jan. 7, 1997

[54] MOUNTING MEANS AND METHOD FOR VIBRATION MEMBER

[75] Inventor: Patrick M. Cunningham, Bridgewater, Conn.

[73] Assignee: Branson Ultrasonics Corporation, Danbury, Conn.

[21] Appl. No.: 507,053

[22] Filed: Jul. 25, 1995

Related U.S. Application Data

[63] Continuation-in-part of Ser. No. 194,108, Feb. 9, 1994, Pat. No. 5,443,240.

[51] Int. Cl.[6] .......... F16M 3/00

[52] U.S. Cl. .......... 248/638; 228/1.1; 248/568; 310/345

[58] Field of Search .......... 248/638, 676, 248/637, 568, 569; 310/322, 323, 345, 26; 156/73.1; 228/1.1

[56] References Cited

U.S. PATENT DOCUMENTS

| | | | |
|---|---|---|---|
| 2,891,178 | 6/1959 | Elmore | 310/26 |
| 2,891,179 | 6/1959 | Elmore | 310/26 |
| 2,891,180 | 6/1959 | Elmore | 310/26 |
| 3,429,028 | 2/1969 | Maropis et al. . | |
| 3,679,526 | 7/1972 | Horton . | |
| 3,752,380 | 8/1973 | Shoh | 228/1.1 |
| 4,647,336 | 3/1987 | Coenen et al. | 156/580 |
| 5,443,240 | 8/1995 | Cunningham | 248/638 |

OTHER PUBLICATIONS

Julian R. Frederick, Ultrasonic Engineering.
Starrer–Booster 20 KHZ Drawing.
Telsonic Booster Design Drawing.

*Primary Examiner*—Ramon O. Ramirez
*Attorney, Agent, or Firm*—Polster, Lieder, Woodruff & Lucchesi

[57] ABSTRACT

A mount for a vibratory member, such as an elongate half wavelength resonator, includes a pair of cylindrical flexural tubes, each tube coupled with one end to the nodal region of the member and the other end of each tube coupled to a stationary member. The axial length and the thickness of the tubes are selected to enable the tubes to flex radially responsive to the substantially radial vibrations manifest at the nodal region of the member so as to decouple the vibrations of the member from the stationary member. A method of decoupling a vibration member from its stationary mount is also described.

8 Claims, 4 Drawing Sheets

MOUNTING MEANS AND METHOD FOR VIBRATION MEMBER

CROSS-REFERENCE TO A RELATED APPLICATION

This is a continuation-in-part application of U.S. patent application No. 08/194,108, filed Feb. 9, 1994, now U.S. Pat. No. 5,443,240.

BACKGROUND OF THE INVENTION

This invention relates to mounting means for high frequency vibration members and, more specifically, refers to mounting means for solid resonators, also known as mechanical impedance transformers, sonotrodes, horns, tools, concentrators, couplers and the like, used for coupling high frequency vibrations in the sonic or ultrasonic frequency range to a workplace. The vibrations are used for joining thermoplastic pans, welding metal parts, abrasive slurry machining of glass or ceramic workpieces and the like. The construction and use of these vibration members is well known and fully described in "Ultrasonic Engineering" (book) by Julian R. Frederick, John Wiley & Sons, New York, N.Y. (1965), pp. 89–103.

The mounting means for a vibration member must be designed to substantially decouple the vibrations of the vibration member, which, when operative, is resonant as a one-half wavelength resonator for high frequency vibrations of predetermined frequency traveling longitudinally therethrough, from the mounting means without impairing the operation of the vibration member. Absent such decoupling, there is a loss of vibratory energy and the transmission of vibrations to mounting means and to other parts of a machine where the existence of vibrations is highly undesirable.

Mounting the vibration member to a stationary support is effected most commonly by providing support means which engage the vibration member at a nodal region or an antinodal region present in the vibration member when the high frequency vibrations are transmitted through the member along its longitudinal axis from a radially disposed input surface at one end to a radially disposed output surface at the other end. Under those conditions and assuming a one-half wavelength resonator, there exists an antinodal region of the vibrations at the input surface and at the output surface, and a nodal region of the vibrations will be present at a region medially between the antinodal regions, the precise location of the nodal region being dependent on the mechanical configuration of the resonator. At the nodal region the vibrations appear as substantially radially directed vibrations.

Mounting means using flexible metallic elements engaging a vibration member at antinodal regions of the vibrations have been disclosed, for instance, in U.S. Pat. No. 3,752,380 entitled "Vibratory Welding Apparatus" issued to A. Shoh, dated Aug. 14, 1973. The disadvantage of that arrangement resides in the fact that the vibration member must be at least one full wavelength long.

Other mounting means coupled to a vibration member are shown in U.S. Pat. Nos. 2,891,178, 2,891,179 and 2,891,180 entitled "Support for Vibratory Devices", issued to W. C. Elmore, dated Jun. 16, 1959. These patents disclose various decoupling means engaging the vibration member at an antinodal region. The decoupling means comprise tuned elements one-half wavelength long. These mounts, because of their complexity and space requirements, have not found wide acceptance and are rarely present in commercial apparatus.

As a result of the above stated shortcomings, several mounts have been developed which support the vibration member at its nodal region. One current design, in wide use, provides the vibration member with a thin flange which protrudes radially from the nodal region of the vibration member. Elastomer "O"-rings are disposed on either side of the flange, all enclosed in a two-piece metallic annular ring, see U.S. Pat. No. 4,647,336 issued to J. D. Coener et al, dated Mar. 3, 1987. The elastomer "O"-rings serve to dampen the vibrations present at the nodal region of the vibration member with respect to the annular ring, which, in turn, is held stationary in a housing. However, this construction, although widely used, has several inherent problems. The "O"-rings are subject to wear and the elastic rings fail to provide the desired degree of rigidity for the vibration member in precision applications, specifically, the vibration member is subject to movement responsive to an axial or lateral force.

In order to overcome the above stated problem, metallic nodal mounts have been developed which provide greater rigidity. However, the designs now in use exhibit significant disadvantages. In one design, the vibration member and the metallic decoupling flange are made from a single piece of material, requiring intricate and expensive machining operations. Another design uses a single circular "L"-shaped cross sectioned decoupling flange which also is machined from bar stock and occupies a rather large amount of space. In addition, in this other design the fastening of the vibration member, due to the design of the decoupling flange, takes place away from the nodal region.

SUMMARY OF THE INVENTION

The present invention discloses a compact and simple metallic mounting means for a vibration member. The vibration member is provided at its nodal region with a radially extending cylindrical flange. Clamping means surround the vibration member. A pair of cylindrical flexure tubes is provided, each tube secured by a press fit with one of its ends to one respective side of the flange, and the other end of such tube secured by a press fit to the clamping means, which comprises two halves axially secured to one another. Additionally, both clamping halves have respective radial surfaces for urging each tube against a respective seating surface disposed on the flange. The cylindrical tubes have a wall thickness and axial length dimensioned for enabling the tubes to flex radially as the vibration member undergoes its radial vibrations in the nodal region. Therefore, the tubes decouple the vibrations of the member from the clamping means which are supported in a stationary housing.

One of the principal objects of this invention is the provision of a new and improved mounting means for a vibration member.

Another principal object of this invention is the provision of a new and improved solid mounting means for a vibration member, specifically a vibration member adapted to be resonant as a one-half wavelength resonator.

Another important object of this invention is the provision of a metallic mounting means coupled to a vibration member at its nodal region, the member exhibiting such nodal region when rendered resonant at a predetermined frequency.

A further object of this invention is the provision of a mounting means for a vibratory member adapted to be resonant as a one-half wavelength resonator, the mounting means including a pair of cylindrical tubes for decoupling the vibrations manifest at the nodal region of the member from substantially stationary clamping means surrounding the vibratory member.

Another and further object of this invention is the provision of a metallic and solid mounting means for a vibration member engaging such member at its nodal region, the mounting means being characterized by simplicity of construction and low cost.

Still another and further object of this invention is the provision of a nodal mount for a vibration member, the mount exhibiting greater rigidity and having a lower power loss than prior art means using elastic rings for decoupling vibrations.

Further and still other objects of this invention will become more clearly apparent from the following description when taken in conjunction with the accompanying drawings.

BRIEF DESCRIPTION OF THE DRAWINGS

Corresponding reference characters indicate corresponding parts throughout the several views of the drawings.

DESCRIPTION OF THE PREFERRED EMBODIMENTS

The mounting means described hereafter is particularly suited for mounting an elongated resonator, dimensioned to be resonant as a one-half wavelength resonator when high frequency vibrations of predetermined frequency traverse such resonator longitudinally, at its nodal region of longitudinal vibrations. In a typical industrial apparatus, the predetermined frequency is in the ultrasonic range, for instance 20 KHz, and the apparatus includes a stack of three vibration members, namely an electroacoustic transducer assembly for converting applied electrical high frequency energy to mechanical vibrations, an intermediate coupler, also known as "booster horn", for receiving the vibrations from the converter and coupling them at the same amplitude or increased amplitude to an output horn, tool, sonotrode, etc., which couples the vibrations to a workpiece. In order to be operative, all members of the stack are dimensioned to be resonant at the predetermined frequency. The booster horn, aside from functioning as a mechanical impedance transformer, also serves in most cases as a means for supporting the stack in a stationary housing. The following description describes the mounting means in connection with a booster horn, although the invention is applicable also to other vibration members of a similar nature.

Figure 1:
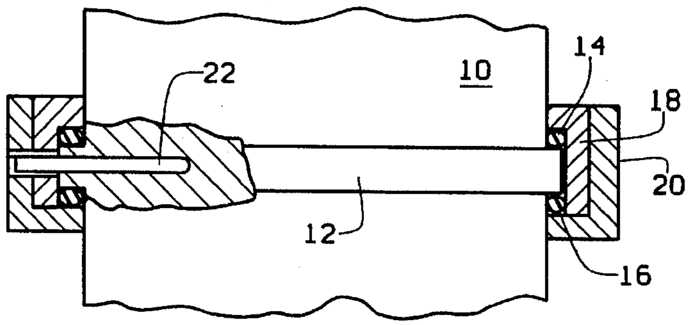
FIG. 1 PRIOR ART
FIG. 1 is an elevational view, partly in section, of a typical prior art mounting means in wide use.

Referring now to the drawing figures and in particular to FIG. 1, there is shown a widely used prior an mounting means. Numeral 10 denotes the body of a typical booster horn, made from aluminum or titanium, which is provided at its nodal region of longitudinal vibrations with a radially extending flange 12. Elastomer "O"-rings 14 and 16 are provided, one ring on either side of the flange 12, and both the rings and the flange are enclosed within a set of "L"-shaped annular metal rings 18 and 20 which are secured to one another by a set of radial pins 22. The elastomer rings serve to decouple the vibrations of the vibration member (booster horn) from the surrounding support rings 18 and 20 which, in turn, are inserted into and supported by a circular groove disposed in a larger housing, not shown.

It will be apparent that the prior art mounting means has inherent disadvantages with respect to stack rigidity arising from the elasticity of the "O"-rings, and that the latter rings are subject to aging and wear due to the dissipation of vibratory energy.

Figure 2:
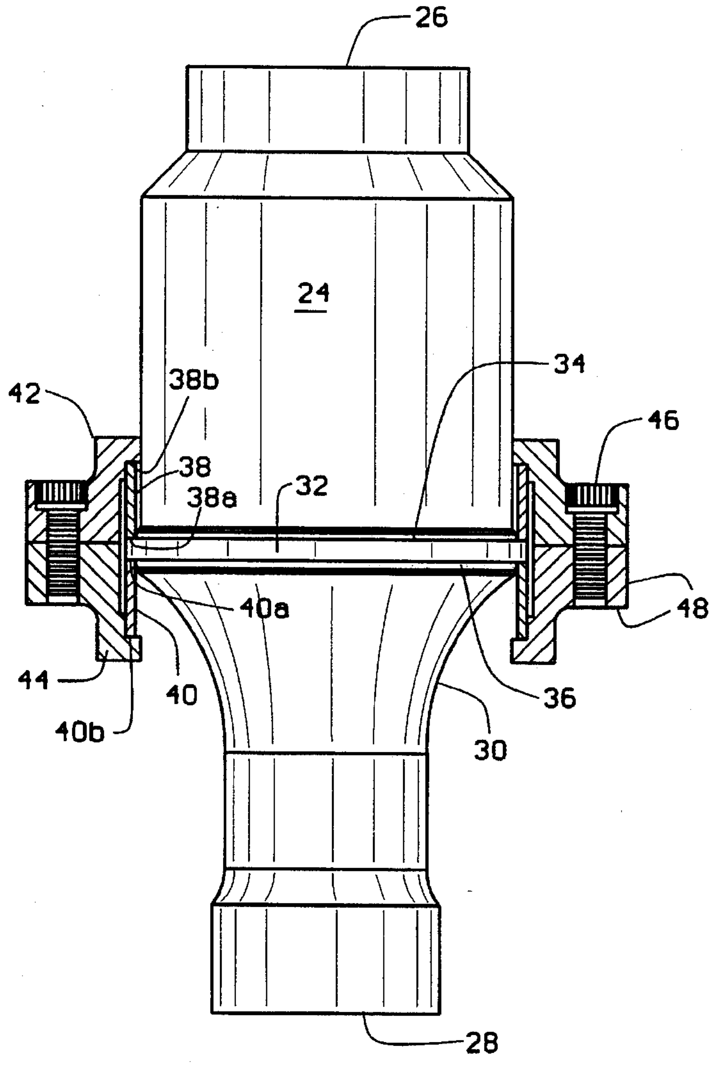
FIG. 2 is an elevational view, partly in section, of the improved mounting means forming the present invention.
Figure 3:
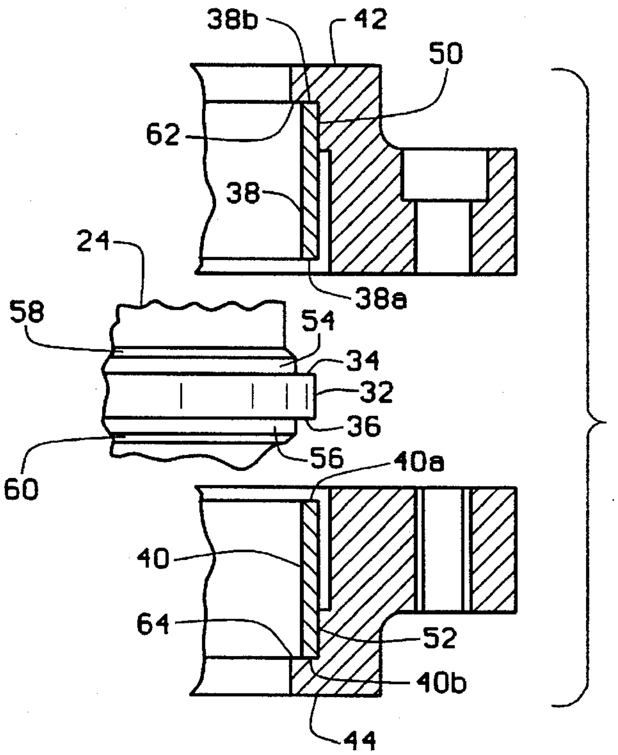
FIG. 3 is an exploded view of parts shown in FIG. 2.

The improved, so-called rigid, nodal mount design is shown in FIGS. 2 and 3. The booster horn 24, an elongated round body, is provided with a radially disposed input surface 26 (shown in FIG. 2) for being mechanically coupled to the output surface of an electroacoustic transducer assembly for receiving mechanical high frequency vibrations therefrom. The opposite radially disposed output surface 28 provides the vibrations to the input surface of a horn which, in turn, transmits the vibrations to a workpiece, see Frederick supra. The booster horn depicted has a gain section, generally identified by numeral 30, for acting as a mechanical amplifier for the vibrations transmitted therethrough from the input surface 26 to the output surface 28.

When vibrations of the predetermined frequency are transmitted, booster horn 24 is rendered resonant as a one-half wavelength resonator and a nodal region of such vibrations is manifest about medially between the antinodal regions present at the input surface 26 and output surface 28, respectively. As stated heretofore, the precise location of the nodal region is dependent upon the configuration of the horn. As shown in FIG. 2, an annular flange 32 protrudes radially from the nodal region of the horn. Each side of the flange 32 is provided with identical seating means 34 and 36 for receiving thereupon one end 38*a*, 40*a* of a respective flexure tube 38 and 40. The other end 38*b*, 40*b* of each tube is seated in a respective half of clamping means 42 and 44. A set of screws 46 secures the clamp halves to one another. The outer surfaces 48 of the clamp means are configured for being mounted within a circular groove of a larger housing, which thereby supports the member or a stack of resonators.

The distal ends of the tubes 38, 40 have a press fit with the respective cylindrical surfaces 50 and 52 of the clamp rings 42, 44, see FIG. 3. The seating means 34 and 36 are of the "L" shaped configuration including cylindrical axially disposed surfaces 54 and 56 and the radial bearing surfaces 34, 36. The cylindric surfaces 54, 56 of the seating means are spaced radially inwardly of the radial bearing surfaces 34, 36 and extend axially therefrom. Preferably, the cylindric surfaces axially locate the ends of the tubes with respect to the bearing surfaces and are dimensioned to provide a close or press fit with the proximate ends of the tubes 38 and 40. In order to effect the press fit, respective chamfered surfaces 58 and 60 are disposed on each side of the flange 32 for guiding the tubes upon the surfaces 54 and 56.

The mounting means are assembled by pressing one end of a respective tube into one end of the clamping halves 42 and 44. As stated, a press fit exists by virtue of surfaces 50 and 52 being machined to have a slightly smaller inside diameter than the outside diameter of the tubes. The clamp halves with tubes firmly pressed therein are then placed about the booster horn, see FIG. 3, and closed upon one another by tightening screws 46. The proximate ends of the tubes 38 and 40 are guided over the respective chamfered surfaces 58 and 60, and pressed upon the abutting axial surfaces 54 and 56, which have a slightly larger diameter than the inside diameter of the tubes 38 and 40. The radial surfaces 60 and 62 of the respective clamp halves cause a force upon the associated tube, and as the screws are tightened, the tubes are urged to slide over the chamfered surfaces, the abutting cylindrical surfaces and onto the radial surfaces of the seating means 34 and 36.

As a result of the press fit, the proximate ends 38*a*, 40*a* of the tubes 38, 40 are inhibited from undergoing relative motion with respect to the flange 32, and the distal ends 38*b*, 40*b* are inhibited from undergoing relative motion with respect to the clamping means 42, 44. The tubes 38, 40, in a typical case, are made from aluminum and have an axial length and wall thickness dimensioned to flex or yield radially for decoupling the vibrations manifest in the nodal region of the member from the substantially stationary clamping means. In a typical embodiment where the horn is dimensioned to be resonant at the ultrasonic frequency of 20 KHz, each tube has an axial length of 11.43 mm, an outer diameter of 55.4 mm, and a wall thickness of 1.29 mm. As is evident from FIGS. 2 and 3, there is sufficient clearance between the midsection of the tubes and the clamping means to enable the tubes to flex radially as is required by the radial motion of the horn at its nodal region, thus effecting decoupling of the booster horn vibrations from the stationary clamping means.

The present construction has the advantage of simplicity. Importantly, however, the improved mount per FIG. 2 fits mechanically into the same housing as the prior art design per FIG. 1. Therefore, there exists the capability of interchanging assemblies, which feature is of significance in obtaining improved performance from currently installed equipment.

Figure 4:
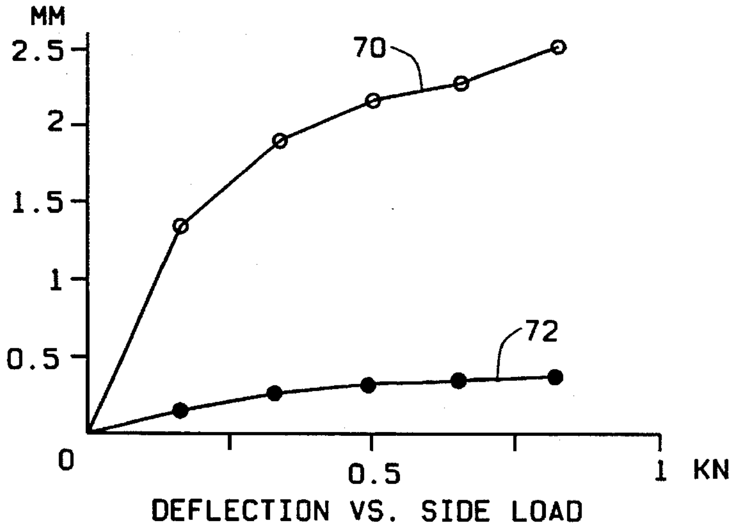
FIG. 4 is a graph showing deflection vs. side load for the prior art design per FIG. 1 and the improved mount depicted in FIG. 2.
Figure 5:
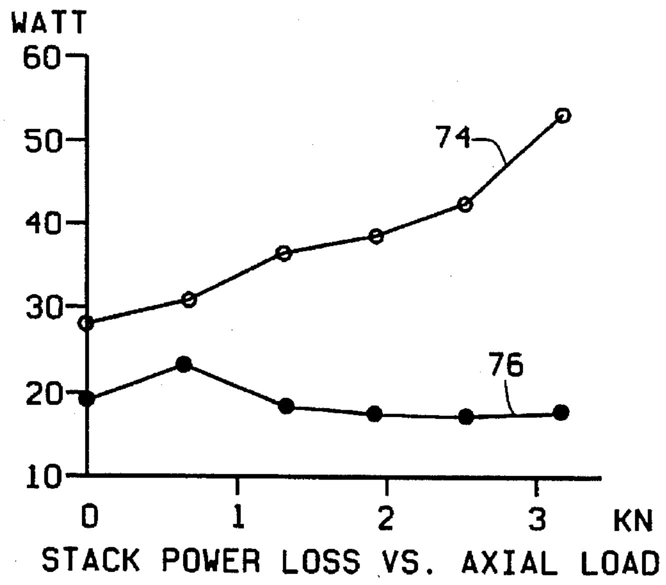
FIG. 5 is a graph showing stack power loss vs. axial load for the prior art mount and the improved mount.
Figure 6:
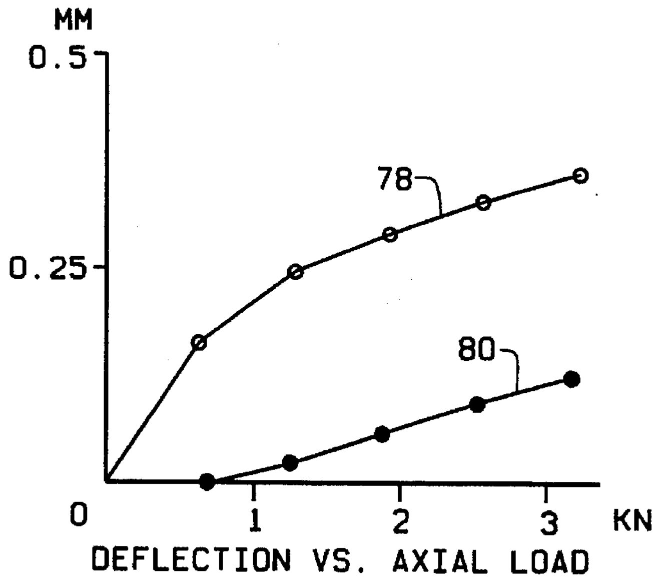
FIG. 6 is a graph showing deflection vs. axial load for the prior art mount and the improved nodal mount construction disclosed herein.

FIGS. 4, 5 and 6 depict the improved results obtained by the new mounting means disclosed heretofore. FIG. 4 shows the measurement on a stack as described heretofore of lateral deflection vs. side load. The deflection is measured in millimeters at the median or nodal area of an output horn and the load is measured in kilo-newtons. Curve 70 shows the "O"-ring assembly per FIG. 1, whereas curve 72 shows the greatly reduced deflection achieved with the solid mount construction per FIG. 2. FIG. 5 shows the stack electrical power loss vs. axial load. Curve 74 represents the measurements on the elastomer ring construction while curve 76 shows the much reduced power loss of the design per FIG. 2. The large power loss per curve 74 is primarily due to an increase in stiffness of the "O"-rings. FIG. 6 depicts the deflection versus axial load. Once again, curve 78 relates to the resilient mount design, whereas curve 80 applies to the solid mount design shown in FIG. 2. In all instances, the improvement achieved is significant.

Figure 7:
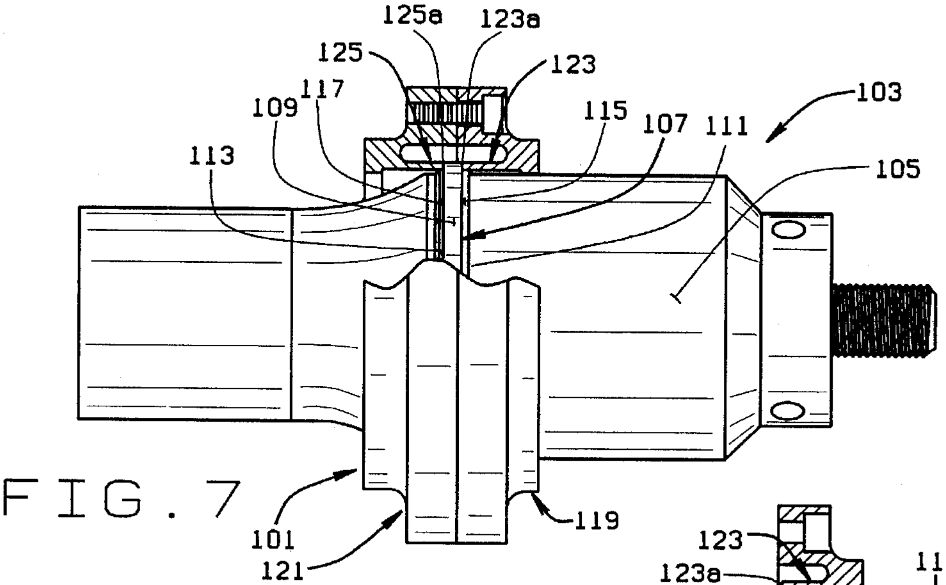
FIG. 7 is an elevational view, partly in section, of another embodiment of the improved mounting means forming the present invention.
Figure 8:
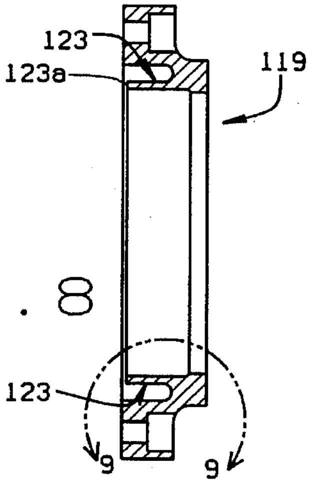
FIG. 8 is a cross-sectional view of one of the mounting means shown in FIG. 7 illustrating an integral cylindrical tube which engages a cylindrical flange on an ultrasonic vibration member so as to decouple the vibrations of the vibration member from the clamping rings which in turn are supported by a stationary support.
Figure 9:
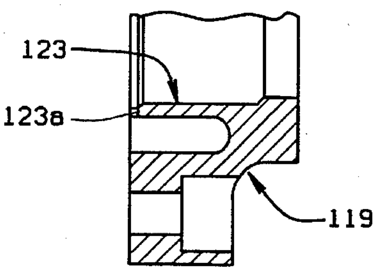
FIG. 9 in an enlarged view of the clamping ring and the integral tube taken along line 9—9 of FIG. 8.

Referring now to FIGS. 7–9, another embodiment of the mounting means of the present invention is shown in its entirety at 101. As shown in FIG. 7, mounting means 101 is applied to an ultrasonic booster horn assembly, as is generally indicated at 103. The booster horn assembly has a booster horn 105 which has an annular mounting flange 107 which extends radially outwardly from the body of the booster horn and which is located generally at the nodal region of the booster horn. Flange 107 has an outer cylindrical surface 109 which is generally coaxial with booster horn 105 and has oppositely facing annular seating surfaces 111 and 113 extending radially inwardly from outer cylindrical surface 109 toward the body of the booster horn. It will be noted that seating surfaces 111 and 113 face in opposite axial directions. Further, flange 107 has a pair of axial (cylindrical) seating surfaces or walls 115, 117 which extend in axial direction from seating surfaces 111, 113. It will be appreciated that flange 107 on booster horn 105 is generally similar to flange 32 on booster horn 24 in construction and function and that bearing surfaces 111, 113 and cylindric surfaces 115, 117 have a construction and function similar to the surfaces 34, 36 and 54, 56 of flange 32 heretofore described.

Mounting means 101 comprises a pair of clamping rings 119, 121, generally similar to clamping means 42, 44 described above in regard to FIGS. 2 and 3. More specifically, clamping rings 119, 121 each have a flexural tube, as indicated at 123, 125, each of which is integral with its respective clamping ring. That is, each flexural tube 123, 125 is preferably machined from the same piece of metal as its respective clamping ring such that the flexural tube is cantilevered from a portion of the clamping ring. It will be appreciated that the flexural tubes 123, 125 are the equivalent of tubes 38, 40, as above described, for vibrationally decoupling the booster horn 105 from its mount. Like tubes 38, 40, the free ends 123*a*, 125*a* of tubes 123, 125 have a press fit with the respective axial (or cylindrical) surfaces 115, 117 of flange 107 such that no relative movement between the inner walls of the flexure tubes and the axial (or cylindric) surfaces 115, 117 of the flange occurs. The clamping rings are forcefully drawn together by means of screws, similar to screws 46 as shown in FIG. 2, such that the ends of the flexural tubes bear solidly against a respective bearing surface 111, 113 of flange 107.

It will be appreciated that since the other ends of the flexure tubes 123, 125 are integral with their respective clamping rings 119, 121, the other ends of the tubes are prevented from undergoing relative movement relative to the clamping rings. Further, the length and thickness of the flexure tubes 123, 125 is such that tubes flex or yield radially for decoupling the vibration manifest in the nodal region of booster horn 105 from the substantially stationary clamping members 119, 121.

Figure 10:
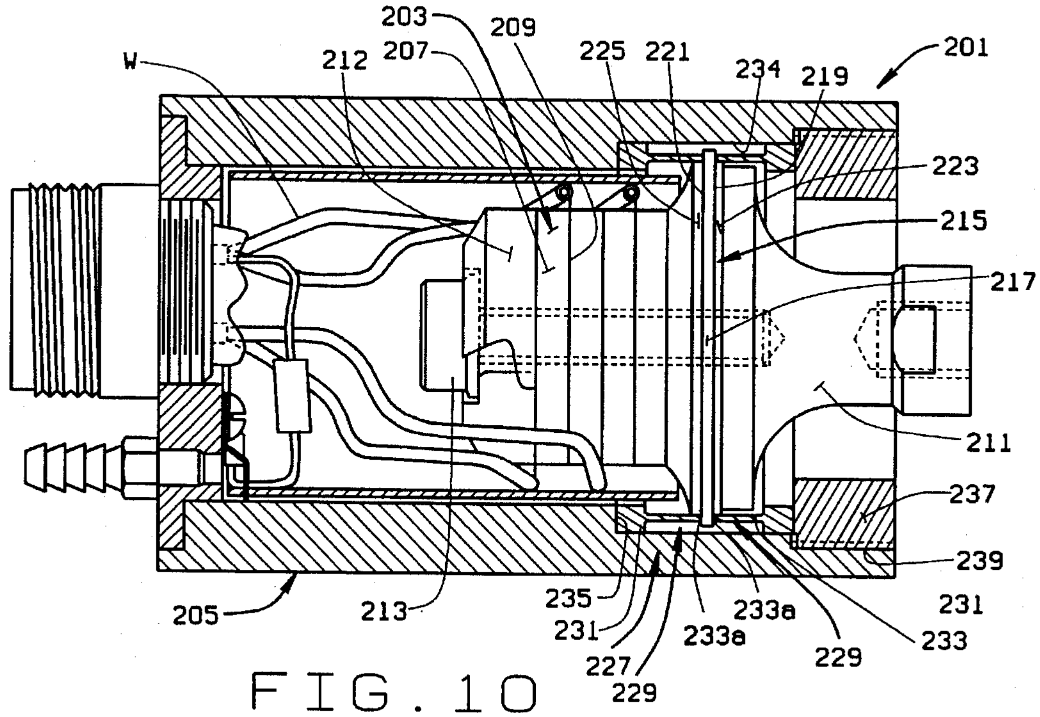
FIG. 10 is a cross-sectional view of an electroacoustic transducer assembly having a vibration member mounted within its stationary support by means of the improved mounting means of the present invention.

Referring now to FIG. 10, still another embodiment of the mounting means of the present invention is indicated in its entirety at 201 for mounting an electroacoustic transducer assembly, as generally indicated at 203, within a stationary support housing or tube 205. The electroacoustic transducer assembly has a stack of alternating piezoelectric disc members 207 and electrode discs 209 securely mounted between a front mass 211 and a rear mass 212 by a bolt 213. The piezoelectric disc members are supplied with electrical power by means of wires W in the conventional manner. The front mass 211 of the electroacoustic transducer assembly further has a circumferential flange 215 located generally at the nodal region of the transducer assembly. The flange has an outer cylindrical surface 217, radial bearing surfaces 219 and 221 extending radially inwardly of the flange and facing in opposite axial directions, and generally cylindric surfaces 223, 225 which extend axially from the bearing surfaces 219 and 221. Generally, flange 215 is similar in construction and function to flange 32 on booster horn 24 and to flange 107 on booster horn 105.

In accordance with this invention, transducer assembly 203 is mounted within its stationary tube 205 by means, as generally indicated at 227, for decoupling the transducer assembly 203 when resonant from its stationary tube or support 205. More specifically, decoupling means 227 comprises a pair of decoupling rings, as indicated at 229, each having a base ring 231 and an axially extending flexural tube 233 integral with the base ring. As shown in FIG. 10, each flexural tube 233 has an inner cylindrical wall which, at its outer end, bears against a respective cylindric bearing surface 223 or 225 of flange 215. Further, each flexural tube 233 has an outer end 233*a* which bears against a respective bearing surface 219, 221. The end 233*a* and the inner wall of flexural tube 233 fit snugly (preferably with a press fit) with a respective cylindric wall 223, 225 on the flange so as to insure that there is no relative movement between the end of the flexural tube and the adjacent portion of booster horn 203. It will be further understood that the outermost cylindric surface on base ring 231 of each decoupling ring 229 has a press fit within the inner cylindric surface 234 of stationary tube 205. The innermost decoupling ring 229 is installed on a shoulder 235 provided within tube 205 with the end of the base ring 231 bearing solidly on the shoulder. A compression ring 237 is threaded into a threaded bore 239 provided in the end of tube 205 so as to forcibly compress the decoupling rings 229 between shoulder 235 on the tube 205 and to force the flexure tubes 233 of each of the decoupling rings into firm bearing engagement with the bearing surfaces 219, 221 of flange 215. Because of the close fit of the inner walls of the flexural tubes 233 against cylindric walls 223, 225 of flange 215, a press fit between the inner walls of the tubes and the cylindric walls of the flange is effected upon the forcible compression of the decoupling rings into tube 205.

As with flexure tubes 38, 40 and 123, 125 described above, flexural tubes 233 are made of a suitable metal and have an axial length and wall thickness dimensioned to flex or yield radially for decoupling the vibration member (i.e., transducer assembly 203) in the nodal region thereof from tube 205 and for enabling the flexural tubes to flex radially as is required by the radial motion of the transducer assembly at its nodal region, thus effecting decoupling of the booster horn vibrations from the stationary tube 205. In short, decoupling means 227 is the equivalent of the decoupling means shown in FIGS. 2 and 3, and the decoupling means shown in FIGS. 7–9.

It will be understood that the mounting means 101 and 201 described in regard to FIGS. 7–9 and in FIG. 10, respectively, operate generally in the manner and with the enhanced performance as the embodiments shown in FIGS. 2–6.

While there have been described and illustrated preferred embodiments of the present invention, it will be apparent to those skilled in the art that various changes and modifications may be made without departing from the principle of the invention, which shall be limited only by the scope of the appended claims.

What is claimed is:

1. Mounting means for a vibration member dimensioned to be resonant as a resonator for vibrations of predetermined frequency traveling longitudinally therethrough, and when resonant exhibiting two respective antinodal regions and a nodal region of said vibrations, the improvement comprising:

a flange extending radially from said vibration member substantially at said nodal region thereof, said flange including bearing surfaces;

a pair of mounting rings surrounding said vibration member generally at the location of said flange, each of said mounting rings having a flexural tube integral therewith and extending axially therefrom, said flexural tube having an end bearing against one of said respective bearing surfaces of said flange such that relative movement between said end of said flexural tube and its respective said bearing surface is inhibited, said flexural tubes having an axial length and wall thickness dimensioned for enabling each tube to flex radially responsive to said member being resonant and thereby undergoing substantially radial motion at its nodal region; and means for axially clamping said flexural tubes relative to said flange such that the ends of said flexural tubes bear against said bearing surfaces so as to decouple the vibrations of said vibration member from said means for clamping.

2. Mounting means as set forth in claim 1 further including a plurality of threaded members for forcefully drawing said mounting rings in axial direction toward one another so as to force the ends of said flexural tubes into forceful engagement with said bearing surfaces of said flange.

3. Mounting means as set forth in claim 1 wherein each said mounting ring includes a clamping portion spaced radially outwardly of said flexural tube with a gap between said flexural tube and said clamping portion.

4. Mounting means as set forth in claim 1 wherein said mounting rings mount said vibration member within a stationary member and decouple the vibrations of said vibration member from said stationary member, said stationary member having a shoulder therewithin, each said flexural tubes having a base ring integral therewith with the base ring of one of said flexural tubes bearing against said shoulder, and wherein said means for clamping comprises means for forcefully bearing against the base ring of said other flexural tube so as to force its flexural tube into engagement with its respective bearing surface and to in turn force said other bearing surface of said flange into bearing engagement with the end of said other flexure tube whose base ring is bears on said shoulder of said stationary member.

5. Mounting means as set forth in claim 4 wherein said means for bearing against the base ring of said other flexural tube is a ring axially threaded into said stationary member.

6. Mounting means as set forth in claim 1 wherein said vibration member is an electroacoustic transducer assembly.

7. A method of mounting a vibration member relative to a supporting member so as to decouple the vibrations of said vibration member from said supporting member, said vibration member being dimensioned for being resonant as a resonator for vibrations of predetermined frequency traveling longitudinally therethrough and, when resonant, having a nodal region of said vibrations, said vibration member having a flange substantially at said nodal region, said flange having surfaces for receiving thereupon a pair of flexural tubes extending axially in opposite direction from one another, said method comprising the steps of:

providing a pair of flexural tubes surrounding said vibration member generally at the location of said flange with an end of each of said flexural tubes engaging a respective one of said surfaces of said flange, said flexural tubes having an axial length and wall thickness so as to enable each tube to flex radially responsive to said vibration member being resonant; and clamping said flexural tubes relative to said surfaces of said flange such as to substantially inhibit relative motion between said respective ends of said flexural tubes and said flange thereby to decouple the vibrations manifest at said flange from said supporting member.

8. The method as set forth in claim 7 wherein said flange has bearing surfaces that face in opposite axial directions of said vibration member and cylindrical location surfaces spaced radially inwardly from said bearing surfaces, each of said flexural tubes having an inner wall, wherein said step of clamping said flexural tubes to said surfaces comprises axially clamping each said flexural tubes to said flange with the end of each tube engaging its respective said bearing surface of said flange and with said inner wall of each tube having a press fit with its respective said cylindrical location surface.

* * * * *